(12) United States Patent
Zhang et al.

(10) Patent No.: US 12,236,203 B2
(45) Date of Patent: Feb. 25, 2025

(54) TRANSLATION METHOD, MODEL TRAINING METHOD, ELECTRONIC DEVICES AND STORAGE MEDIUMS

(71) Applicant: BEIJING BAIDU NETCOM SCIENCE TECHNOLOGY CO., LTD., Beijing (CN)

(72) Inventors: Ruiqing Zhang, Beijing (CN); Xiyang Wang, Beijing (CN); Hui Liu, Beijing (CN); Zhongjun He, Beijing (CN); Zhi Li, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 17/951,216

(22) Filed: Sep. 23, 2022

(65) Prior Publication Data

US 2023/0153543 A1    May 18, 2023

(30) Foreign Application Priority Data

Nov. 16, 2021 (CN) .......................... 202111353074.X

(51) Int. Cl.
  *G06F 40/51*  (2020.01)
  *G06F 40/42*  (2020.01)
(52) U.S. Cl.
  CPC .............. *G06F 40/51* (2020.01); *G06F 40/42* (2020.01)

(58) Field of Classification Search
  USPC ....................................................... 704/2–7
  See application file for complete search history.

(56) References Cited

U.S. PATENT DOCUMENTS 10,268,684 B1 *   4/2019  Denkowski ............. G06F 40/44
2016/0085748 A1 * 3/2016  Goto ....................... G06F 40/44
                                                                704/4
(Continued)

FOREIGN PATENT DOCUMENTS

CN    109829550 A    5/2019
CN    109960814 A    7/2019
(Continued)

OTHER PUBLICATIONS

Li et al., A Survey of Multi-Strategy Machine Translation, Journal of Chinese Information Processing, vol. 29, No. 2, Mar. 2015, 23 pages.

(Continued)

*Primary Examiner* — Leonard Saint-Cyr
(74) *Attorney, Agent, or Firm* — Brooks Kushman P.C.

(57) ABSTRACT

A translation method, a model training method, apparatuses, electronic devices and storage mediums, which relate to the field of artificial intelligence technologies, such as machine learning technologies, information processing technologies, are disclosed. In an implementation, a weight for each translation model in at least two pre-trained translation models translating a to-be-translated specified sentence is acquired based on the specified sentence and a pre-trained weighting model; and the specified sentence is translating using the at least two translation models based on the weight for each translation model translating the specified sentence.

18 Claims, 8 Drawing Sheets

(56) References Cited

U.S. PATENT DOCUMENTS

2017/0060855 A1* 3/2017 Song .................. G06F 40/55
2017/0124071 A1* 5/2017 Huang ................. G06F 40/51

FOREIGN PATENT DOCUMENTS

| CN | 110162800 A | 8/2019 |
| CN | 112329482 A | 2/2021 |
| CN | 112733552 A | 4/2021 |
| JP | 2009064051 A | 3/2009 |
| WO | 2019114695 A1 | 6/2019 |

OTHER PUBLICATIONS

Notice of Reasons for Refusal of Japanese patent application No. JP 2022116365 issued Oct. 3, 2023, 5 pages.

* cited by examiner

*x*: Whenever did you find time to do all that cooking?

$MT_1$ 什么时候你有时间，做这些饭吧 ×

$MT_2$ 你什么时候有时间做所有的烹饪？ ×

$MT_3$ 你什么时候找到了这些时间做这些饭的？ ×

Ensemble 你什么时候有时间做这些饭的？ √

Fig. 1

TRANSLATION METHOD, MODEL TRAINING METHOD, ELECTRONIC DEVICES AND STORAGE MEDIUMS

CROSS-REFERENCE TO RELATED APPLICATIONS

The present disclosure claims the priority and benefit of Chinese Patent Application No. 202111353074.X, filed on Nov. 16, 2021, entitled "TRANSLATION METHOD, MODEL TRAINING METHOD, APPARATUSES, ELECTRONIC DEVICES AND STORAGE MEDIUMS." The disclosure of the above application is incorporated herein by reference in its entirety.

TECHNICAL FIELD

The present disclosure relates to the field of computer technologies, and particularly relates to the field of artificial intelligence technologies, such as machine learning technologies, information processing technologies, and more particularly to a translation method, a model training method, apparatuses, electronic devices and storage mediums.

BACKGROUND

Translation is quite technical and professional work, and is completed by a professional translator in a traditional technology.

In recent years, with a development of artificial intelligence, a translation model implemented based on artificial intelligence may greatly improve an efficiency of the translation. The translation model may be implemented using a neural network model. During usage, the translation model may be subjected to a supervised training operation using manually annotated training data. In use, a to-be-translated sentence is input into the translation model, and the translation model may output a translated sentence.

SUMMARY

The present disclosure provides a translation method, a model training method, electronic devices and storage mediums.

According to one aspect of the present disclosure, there is provided a translation method, including acquiring, based on a to-be-translated specified sentence and a pre-trained weighting model, a weight for each translation model in at least two pre-trained translation models translating the specified sentence; and translating the specified sentence using the at least two translation models based on the weight for each translation model translating the specified sentence.

According to another aspect of the present disclosure, there is provided a model training method, including collecting training sentences; and training a weighting model based on the training sentences, at least two pre-trained translation models and a preset random weight distributor.

According to another aspect of the present disclosure, there is provided an electronic device, including at least one processor; and a memory connected with the at least one processor communicatively; wherein the memory stores instructions executable by the at least one processor to enable the at least one processor to perform the method of the aspect as described above and any possible implementation.

According to another aspect of the present disclosure, there is provided a non-transitory computer readable storage medium with computer instructions stored thereon, wherein the computer instructions are used for causing a computer to perform the method of the aspect as described above and any possible implementation.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings, FIG. 1 is a schematic diagram of machine translation according to the present disclosure;

DETAILED DESCRIPTION

Figure 2:
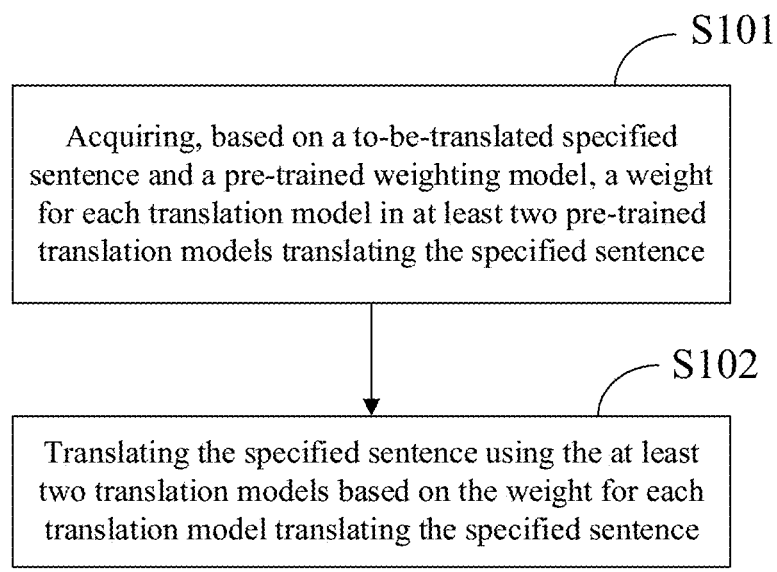
FIG. 2 is a schematic diagram according to a first embodiment of the present disclosure.

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Apparently, the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a terminal device in the embodiments of the present disclosure may include, but is not limited to, a mobile phone, a personal digital assistant (PDA), a wireless handheld device, a tablet computer, and other smart devices; a display device may include, but not limited to, a personal computer, a television, and other devices with a display function.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

A task of a machine translation (MT) model may be described as input: a source language sentence containing n words $X=(x_1, x_2, \ldots, x_n)$; and output: a translation result $Y=(y_1, y_2, \ldots, y_m)$ corresponding to X, where $y_i$ represents an $i^{th}$ word translated on a target side, and may also be referred to as an $i^{th}$ token in a neural network model.

An autoregressive inference method may be represented as:

$$p(y_t|x)=p(y_t|y_{1,2\ldots t-1},x) \quad (1)$$

That is, generation of a $t^{th}$ word in a target translation result depends on the source language sentence X and t−1 words generated before the $t^{th}$ word on the target side.

In order to improve a translation effect of the MT model, multiple MT models are usually trained, and an overall translation effect of an apparatus is achieved by model ensemble.

FIG. 1 is a schematic diagram of machine translation according to the present disclosure. As shown in FIG. 1, for example, a translation apparatus includes three translation models MT1, MT2 and MT3. Each of the models MT1, MT2 and MT3 has an individual incorrect translation result, but a correct translation result may be generated by model ensemble. As shown in FIG. 1, for a source language sentence "whenever did you find time to do all that cooking?", MT1 has a translation result "什么时候你有时间, 做这些饭吧? (Shen me shi hou ni you shi jian, zuo zhe xie fan ba?)". MT2 has a translation result "你什么时候有时间做所有的烹饪? (Ni shen me shi hou you shi jian zuo suo you de peng ren?)". MT3 has a translation result "你什么时候找到了这些时间做这些饭的? (Ni shen me shi hou zhao dao le zhe xie shi jian zuo zhe xie fan de?)". After model ensemble, a translation result "你什么时候有时间做这些饭的? (Ni shen me shi hou you shi jian zuo zhe xie fan de?)" is generated. Through comparison, the translation result after model ensemble is more accurate.

Assuming that K MT models are fused in the translation apparatus, the K models may be different models under a same translation architecture or belong to different translation architectures; the translation architecture may be a recurrent neural network (RNN), a convolutional neural network (CNN), or a transformer network.

During model inference, the K models are simultaneously loaded into a graphics processing unit (GPU); in a translation process, every time a target word, for example, a $t^{th}$ target word, is generated, an average of inference probabilities of the K models is calculated using the following formula (2), and the word with the maximum average of the inference probability is a target word at the location.

$$p(y_t|x) = \frac{1}{K}\sum_{k=1}^{K} p(y_t|y_{1,2,\ldots,t-1},x) \quad (2)$$

As described above, during the MT models' ensemble in the translation apparatus, the MT models have a same probability which is 1/K as shown in the above formula (2). This ensemble method ignores differences between the models: some models are suitable for short queries, some models are suitable for long queries, and the models may have different familiar translation fields, such that the ensemble method may still cause an inaccurate translation result of the translation apparatus.

FIG. 2 is a schematic diagram according to a first embodiment of the present disclosure; as shown in FIG. 2, this embodiment provides a translation method, which may be applied to a MT apparatus, and specifically includes the following steps:

S101: acquiring, based on a to-be-translated specified sentence and a pre-trained weighting model, a weight for each translation model in at least two pre-trained translation models translating the specified sentence; and S102: translating the specified sentence using the at least two translation models based on the weight for each translation model translating the specified sentence.

An architecture of the translation apparatus applied in the translation method according to this embodiment may include at least two translation models and one weighting model. A number of the translation models may be set based on actual requirements, and may be 2, 3 or other numbers.

During translation of different sentences, the weighting model gives different weights to the at least two translation models. In other words, the weighting model configuring the weight for each translation model should consider the to-be-translated sentence.

For example, in an embodiment of the present disclosure, some translation models have greater superiority during translation of long sentences, and the weighting model may give a higher weight to the translation model, while some translation models are less good at translating long sentences, and the weighting model may give a lower weight to the translation model. Each translation model is pre-trained.

For another example, in an embodiment of the present disclosure, the translation models may be good at different translation fields, and for translation of sentences of familiar fields, the weighting model may give a higher weight to the translation model. For translation of less-familiar fields, the weighting model may give a lower weight to the translation model.

In specific usage, the to-be-translated specified sentence is input into the pre-trained weighting model, and the weighting model may, based on the to-be-translated specified sentence, output the weight for each of the at least two translation models translating the specified sentence. Specifically, the output of the weighting model may be a weight vector including the corresponding weights of the translation models. Then, the specified sentence may be translated using the at least two translation models based on the weights for each translation model translating the specified sentence.

In the translation method according to this embodiment, with the above technical solution, the weight for translating the specified sentence may be configured for each of the at least two translation models based on the weighting model, such that the specified sentence may be translated by the at least two translation models based on the configured weights, and due to different weights, the translation model which has superiority in the translation of the specified sentence has a larger influence on a translation result, thereby further improving a translation accuracy.

Figure 3:
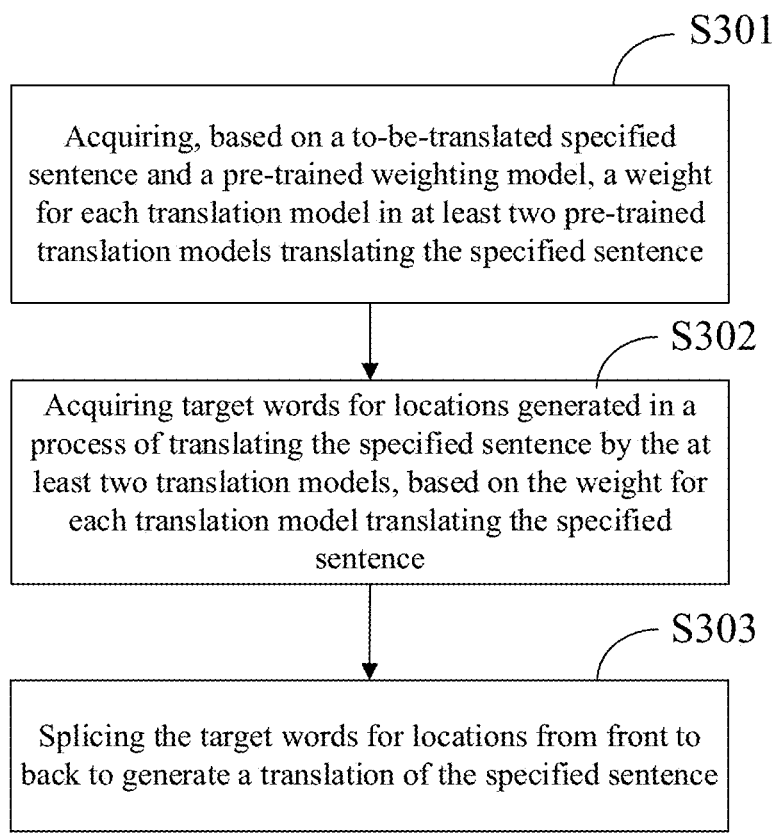
FIG. 3 is a schematic diagram according to a second embodiment of the present disclosure.

FIG. 3 is a schematic diagram according to a second embodiment of the present disclosure; as shown in FIG. 3, this embodiment provides a translation method, and the technical solution of the present disclosure is further described in more detail based on the technical solution of the above-mentioned embodiment shown in FIG. 2. As shown in FIG. 3, the translation method according to this embodiment may include the following steps:

S301: acquiring, based on a to-be-translated specified sentence and a pre-trained weighting model, a weight for each translation model in at least two pre-trained translation models translating the specified sentence.

S302: acquiring target words for locations generated in a process of translating the specified sentence by the at least two translation models, based on the weight for each translation model translating the specified sentence.

In this embodiment, the at least two translation models generate target words one by one from front to back when translating the specified sentence. For a process of determining the target word at any location k, one, two or more candidate words for the $k^{th}$ location may be generated by each of the at least two translation models, and each candidate word may be any word in a dictionary. Then, the target word at the $k^{th}$ location is determined in conjunction with the weights for the at least two translation models translating the specified sentence.

For example, a generation method of the target word corresponding to each location may specifically include the following steps:

(1) acquiring several candidate words for each location predicted in the process of translating the specified sentence by each of the at least two translation models, and probabilities corresponding to the candidate words.

For example, each translation model may predict and output any one, two or more candidate words in the dictionary capable of appearing at the $k^{th}$ location and the probabilities corresponding to the candidate words. In this embodiment, each translation model may predict one, two or more candidate words for each location, which is not limited herein.

In addition, the several candidate words for the same location predicted by different translation models may have an intersection, but may not be completely the same. For example, the candidate words for the $k^{th}$ location predicted by the first translation model may be "有 (you)" with a probability of 0.8, and "做 (zuo)" with a probability of 0.2, and other candidate words with smaller probabilities may not be considered; that is, in this embodiment, for candidate words for each location predicted by each translation model, only candidate words with probabilities greater than a preset probability threshold are considered, and candidate words with smaller probabilities are not considered. The preset probability threshold may be selected according to practical experience, and may be 0.1, 0.05 or other probability values.

Alternatively, for the candidate words for each location predicted by each translation model, only the candidate words with top N probabilities are considered. That is, instead of setting a probability threshold, top N candidate words are taken as the candidate words for the location predicted by the translation model.

(2) calculating an inference probability of each candidate word for each location, based on the probability corresponding to each candidate word predicted during the translation by each of the at least two translation models, and the weight or each translation model translating the specified sentence.

For example, for a specific candidate word for a specific location, the sum of the products of the probabilities corresponding to the candidate word predicted during the translation by the translation models and the weight for a corresponding translation model translating the specified sentence, may be taken as the inference probability of the candidate word for the location, and specifically, the inference probability may be represented with the following formula (3):

$$p(y_t|x) = \Sigma_{k=1}^{K} w_k p_k(y_t|y_{1,2,\ldots,t-1},x) \quad (3)$$

In the formula, the number of the at least two translation models is K as an example, and $w_k$ represents the weight given to the $k^{th}$ translation model by the weighting model.

(3) determining the target word at each location based on the inference probability of the candidate words for each location.

For example, the candidate word with the highest inference probability is acquired from the multiple candidate words for the location as the target word at the location.

Using the above method of this embodiment, the target word at each location may be accurately determined.

S303: splicing the target words for locations from front to back to generate a translation of the specified sentence.

After the target words for all locations are obtained, the target words for the locations are spliced together from front to back, and the translation of the specified sentence is obtained.

Steps S302 to S303 in this embodiment are an implementation of step S102 in the above embodiment shown in FIG. 1, in which the weight for each translation model translating the specified sentence directly affects the generation of the target word at each location. Optionally, in practical applications, the weight for each translation model translating the specified sentence may also directly affect the translation of the entire specified sentence, which is not limited herein.

Figure 4:
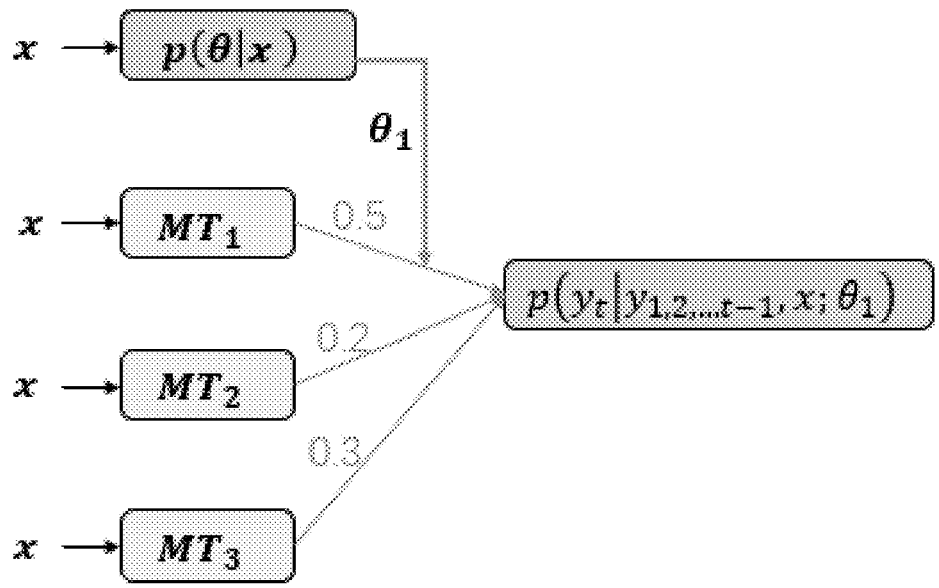
FIG. 4 is an architecture diagram of a translation method according to the second embodiment.

For example, FIG. 4 is an architecture diagram of the translation method according to the second embodiment. As shown in FIG. 4, for example, three translation models MT1, MT2 and MT3 are involved in the translation apparatus, and $p(\theta|x)$ is the weighting model. $P(\theta|x)$ may give a weight vector $\theta_1$ of the three translation models according to the source language sentence x, and as shown in FIG. 4, $\theta_1$ may be represented as (0.5, 0.2, 0.3), and the final translation result may be represented as $p(y_t|y_{1,2,\ldots,t-1}, x; \theta_1)$. Then, the translation models may perform inference according to the differential weights, thus effectively improving the translation accuracy.

In the translation method according to this embodiment, with the above technical solution, the weight for each translation model translating the specified sentence may be fully used, the target words at the locations in the translation of the specified sentence may be generated more accurately, and then, the translation of the specified sentence is generated, thus effectively improving the translation accuracy.

Figure 5:
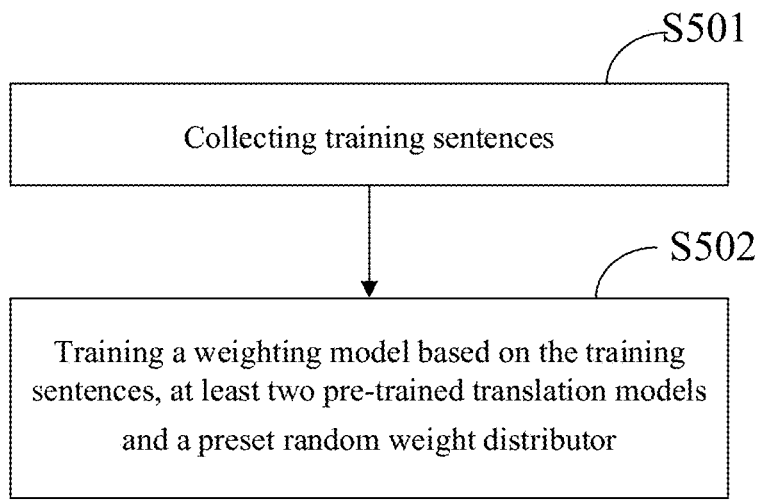
FIG. 5 is a schematic diagram according to a third embodiment of the present disclosure.

FIG. 5 is a schematic diagram according to a third embodiment of the present disclosure; as shown in FIG. 5, this embodiment provides a model training method, which may be applied to a model training apparatus, and specifically includes the following steps:

S501: collecting training sentences; and

S502: training a weighting model based on the training sentences, at least two pre-trained translation models and a preset random weight distributor.

The training sentence in this embodiment is any to-be-translated sentence.

The weighting model in this embodiment is used for configuring weights for the at least two pre-trained translation models translating the training sentences. The random weight distributor randomly configures the weights for the at least two translation models translating the training sentences. Based on the random weight distributor and the training sentences, the weighting model may be trained.

With the model training method according to this embodiment, the weighting model may be trained, such that the weighting model may accurately and reasonably configure the weights for the at least two translation models.

Figure 6:
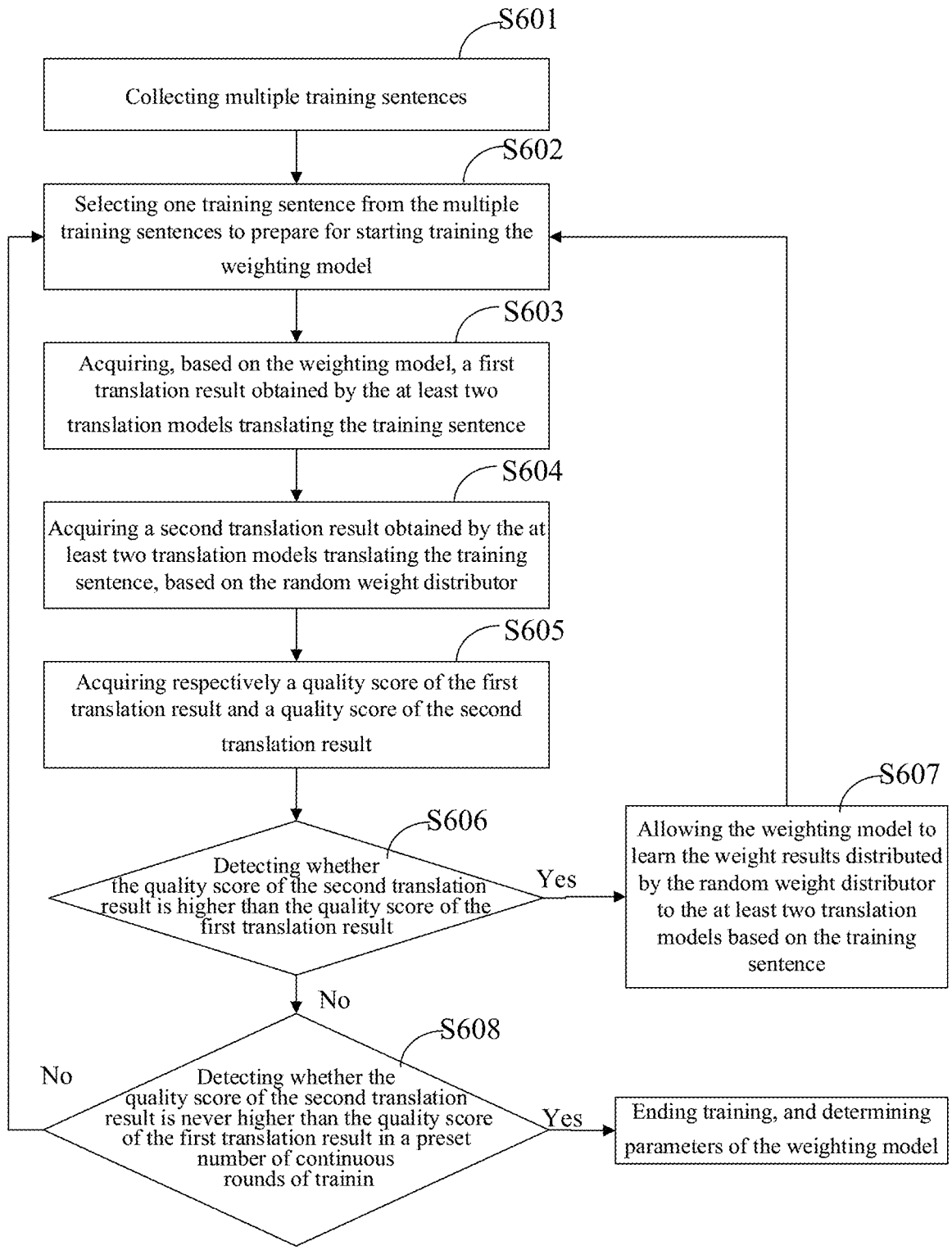
FIG. 6 is a schematic diagram according to a fourth embodiment of the present disclosure.

FIG. 6 is a schematic diagram according to a fourth embodiment of the present disclosure; as shown in FIG. 6, the technical solution of the model training method according to this embodiment of the present disclosure is further introduced in more detail based on the technical solution of the above-mentioned embodiment shown in FIG. 5. As shown in FIG. 6, the model training method according to this embodiment may include the following steps:

S601: collecting multiple training sentences.

S602: selecting one training sentence from the multiple training sentences to prepare for starting training the weighting model.

Specifically, one training sentence may be selected in sequence or randomly.

S603: acquiring, based on the weighting model, a first translation result obtained by the at least two translation models translating the training sentence.

For example, specifically, first weights for translating the training sentence may be configured for the at least two translation models using the weighting model; and then, the training sentence is translated using the multiple translation models, based on the first weights for the at least two translation models, to obtain the first translation result.

The first weights configured by the weighting model for the at least two translation models translating the training sentence may employ a vector including the weights corresponding to the translation models. For the process of translating the training sentence using the multiple translation models based on the first weights of the at least two translation models to obtain the first translation result, reference may be made to the above-mentioned method of the embodiment shown in FIG. 3, and details are not repeated herein.

S604: acquiring a second translation result obtained by the at least two translation models translating the training sentence, based on the random weight distributor.

Similarly, second weights may be configured by the random weight distributor for the at least two translation models translating the training sentence; and then, the training sentence is translated using the multiple translation models based on the second weights for the at least two translation models to obtain the second translation result.

The random weight distributor in this embodiment is suitable for randomly distributing the weights for the at least two translation models translating the training sentences. The second weights and the first weights have a same representation way. Similarly, for the process of translating the training sentence using the multiple translation models based on the second weights of the at least two translation models to obtain the second translation result, reference may be made to the above-mentioned method of the embodiment shown in FIG. 3, and details are not repeated herein.

S605: acquiring respectively a quality score of the first translation result and a quality score of the second translation result.

In this embodiment, the quality score of the first translation result and the quality score of the second translation result may be implemented using a scoring model constructed based on a neural network; for example, the two translation results and the training sentence are input into the scoring model, and the scoring model will give quality comparison of the two translation results. At this point, the scoring model may or may not give a specific score, as long as the quality comparison of the two translation results is given. For example, the high-quality translation result may be given a score of 1, and the low-quality translation result may be given a score of 0, as long as differentiation is realized.

Alternatively, in one embodiment of the present disclosure, the first translation result and the second translation result may be displayed to a professional translator. The professional translator gives the quality score of the first translation result and the quality score of the second translation result. Similarly, a true score may not be given, and only the quality comparison of the two translation results is given.

S606: detecting whether the quality score of the second translation result is higher than the quality score of the first translation result; if yes, executing step S607; and if no, executing step S608.

S607: allowing the weighting model to learn the weight results distributed by the random weight distributor to the at least two translation models based on the training sentence; returning to step S602, acquiring a next training sentence and continuing training.

If the quality score of the second translation result is higher than the quality score of the first translation result, it is indicated that the weight distributed by the random weight distributor is more reasonable, and a more accurate translation result may be obtained; at this point, the weighting model may be controlled to learn the weight results distributed by the random weight distributor to the at least two translation models based on the training sentence. Specifically, in the learning process, parameters of the weighting model may be adjusted, such that when configuring the weights for the at least two translation models based on the training sentence, the weighting model may configure this weight distributed by the random weight distributor, and then learn this weight configuration of the random weight distributor.

S608: detecting whether the quality score of the second translation result is never higher than the quality score of the first translation result in a preset number of continuous rounds of training; if yes, ending training, and determining the parameters of the weighting model; and if no, returning to step S602, acquiring the next training sentence and continuing training.

Step S608 is a training ending condition. The preset number of the rounds may be set according to actual scenarios, for example, may be 10, 20, 30, 50 or other numbers. Specifically, by continuously training in the above-mentioned way, if the quality score of the second translation result is never higher than the quality score of the first translation result in the preset number of continuous rounds of training, it is indicated that the weighting model configures more reasonable weights for the at least two translation models, a higher score may be acquired, and training of the weighting model may be considered to be completed at this point.

Figure 7:
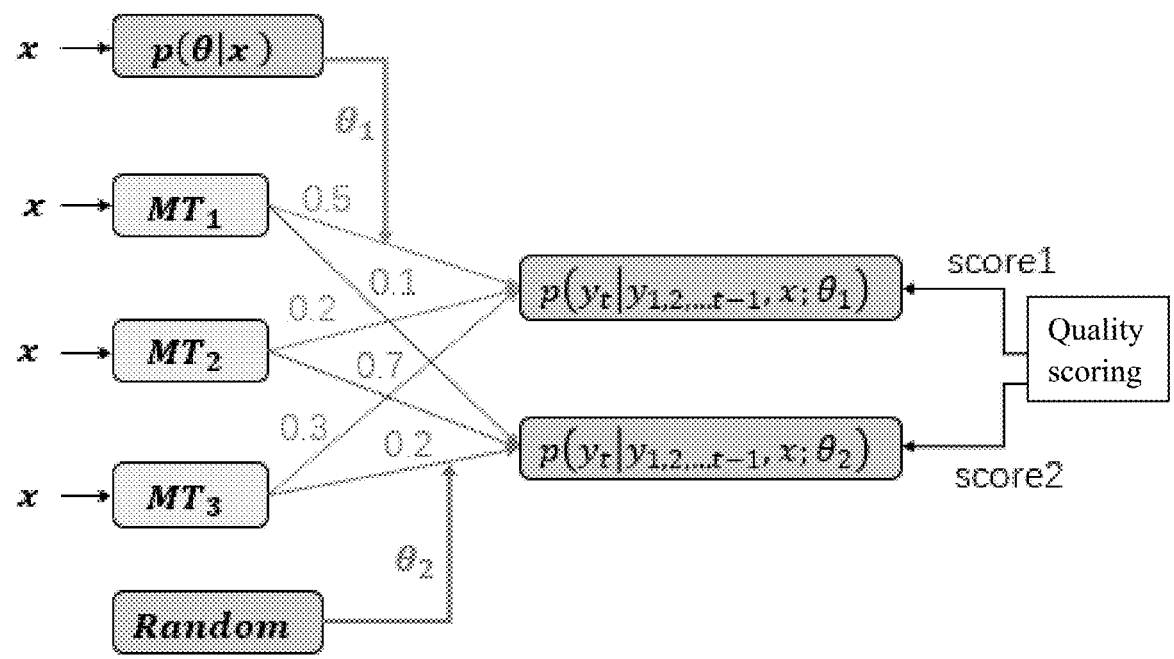
FIG. 7 is an architecture diagram of a model training method according to the fourth embodiment.

For example, FIG. 7 is an architecture diagram of the model training method according to the fourth embodiment. As shown in FIG. 7, similar to FIG. 4, in an architecture in this embodiment, for example, three machine translation models MT1, MT2 and MT3 are involved in the translation apparatus, and $p(\theta|x)$ is the weighting model. The first weight $\theta_1$ is (0.5, 0.2, 0.3), and the first translation result is $p(y_t|y_{1, 2, \ldots, t-1}, x; \theta_1)$. Random represents the random weight distributor θ2, and in this example, the second weight $θ_2$ distributed by the random weight distributor for the three translation models may be represented as: $θ_2=(0.1, 0.7, 0.2)$. Based on the second weight $θ_2$, the second translation result translated by the three machine translation models may be represented as $p(y_t|y_{1, 2, \ldots t-1}, x; θ_1)$, score1 represents the quality score of the first translation result, and score2 represents the quality score of the second translation result.

Figure 8:
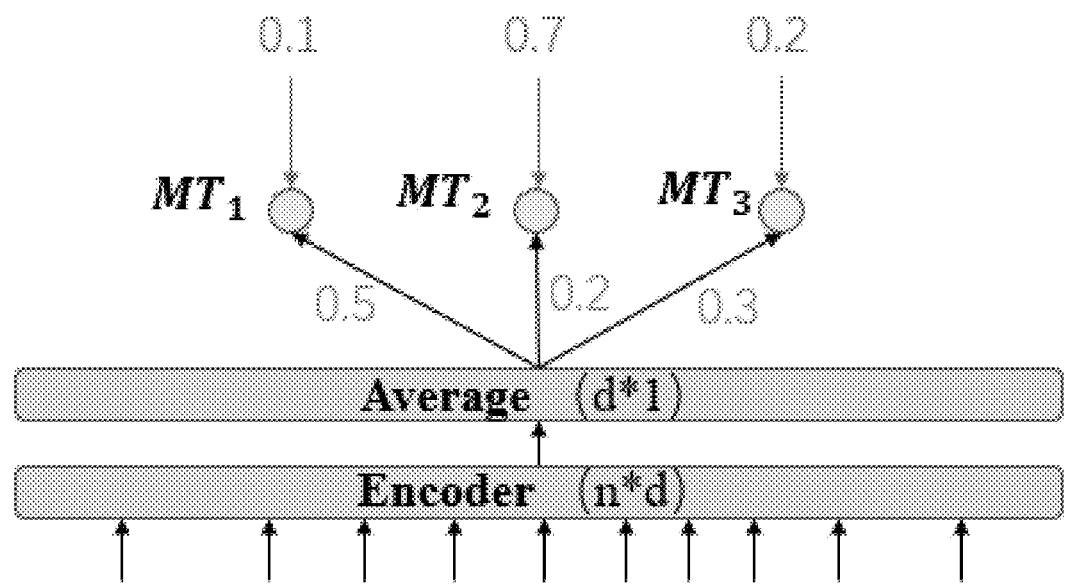
FIG. 8 is a principle diagram of a weighting model according to the fourth embodiment.

FIG. 8 is a principle diagram of the weighting model according to the fourth embodiment. As shown in FIG. 8, a source language sentence "whenever did you find time to do all that cooking?" is taken as an example to describe a realization principle of the weighting model. The weighting model $p(θ|x)$ in this embodiment may be a classification model, and x is encoded by an encoder to obtain an n*d encoding result. The dimension number d in this embodiment may be 128, 256, 512, or the like. Then, the encoding result is averaged according to the sequence dimension to obtain a d-dimension sentence expression, the d-dimension vector is subjected to K classification through a full connection layer, and a probability of the K classification is obtained through a softmax layer, which corresponds to the weight θ of K MT models. For example, for the translation apparatus shown in FIG. 7, the first weights distributed by the weighting model $p(θ|x)$ are (0.5, 0.2, 0.3). If the quality score score2 of the second translation result is higher than the quality score score1 of the first translation result, the weight corresponding to score2 is used as supervision information for learning of the weighting model, and a loss function may be L2 regression loss; that is, the output of the weighting model is fitted with $θ_2$ corresponding to score2.

With the model training method according to this embodiment, the weighting model may fully learn the weight distributed by the random weight distributor when the translation result corresponding to the weight distributed by the random weight distributor has a higher quality, such that the weighting model may more accurately configure the weights for the translation models fused in the translation apparatus, thus further improving the translation accuracy of the translation apparatus fusing the at least two translation models.

Figure 9:
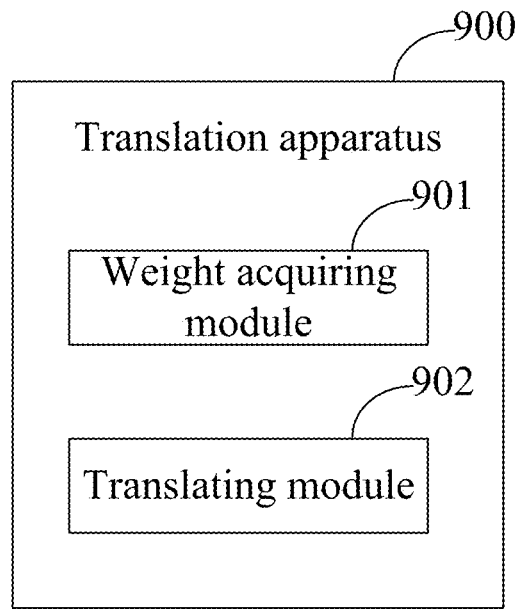
FIG. 9 is a schematic diagram according to a fifth embodiment of the present disclosure.

FIG. 9 is a schematic diagram according to a fifth embodiment of the present disclosure; as shown in FIG. 9, this embodiment provides a translation apparatus 900, including a weight acquiring module 901 configured for, acquiring, based on a to-be-translated specified sentence and a pre-trained weighting model, a weight for each translation model in at least two pre-trained translation models translating the specified sentence; and a translating module 902 configured for translating the specified sentence using the at least two translation models based on the weight for each translation model translating the specified sentence.

The translation apparatus 900 according to this embodiment has the same implementation as the above-mentioned relevant method embodiment by adopting the above-mentioned modules to implement the implementation principle and the technical effects of the translation, and for details, reference may be made to the description of the above-mentioned relevant method embodiment, and details are not repeated herein.

Further optionally, in one embodiment of the present disclosure, the translating module 902 is configured for acquiring target words for locations generated in a process of translating the specified sentence by the at least two translation models, based on the weight for each translation model translating the specified sentence; and splicing the target words for the locations from front to back to generate a translation of the specified sentence.

Further optionally, in one embodiment of the present disclosure, the translating module 902 is configured for acquiring several candidate words for each location predicted in the process of translating the specified sentence by each of the at least two translation models, and probabilities corresponding to the candidate words; calculating an inference probability of each candidate word for each location based on the probability corresponding to each candidate word predicted during the translation by each of the at least two translation models, and the weight for each translation model translating the specified sentence; and determining the target word at each location based on the inference probability of the candidate words for each location.

Further optionally, in one embodiment of the present disclosure, the translating module 902 is configured for: for each candidate word for each location, taking the sum of the products of the probabilities corresponding to the candidate word predicted during the translation by the translation models and the weights for a corresponding translation model translating the specified sentence as the inference probability of the candidate word for the location.

Figure 10:
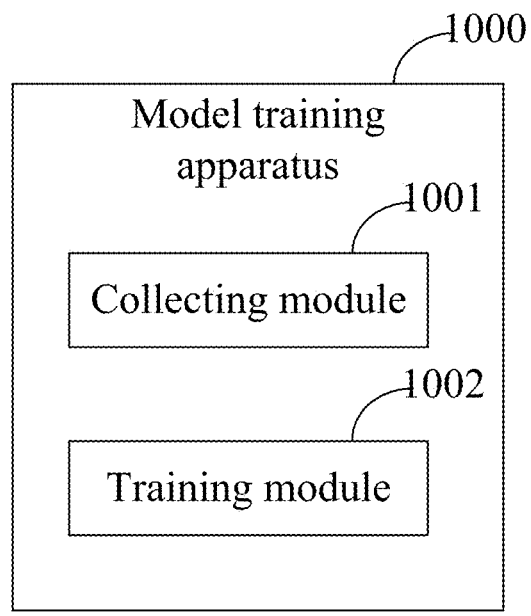
FIG. 10 is a schematic diagram according to a sixth embodiment of the present disclosure.

FIG. 10 is a schematic diagram according to a sixth embodiment of the present disclosure; as shown in FIG. 10, this embodiment provides a model training apparatus 1000, including a collecting module 1001 configured for collecting training sentences; and a training module 1002 configured for training a weighting model based on the training sentences, at least two pre-trained translation models and a preset random weight distributor.

The model training apparatus 1000 according to this embodiment has the same implementation as the above-mentioned relevant method embodiment by adopting the above-mentioned modules to implement the implementation principle and the technical effects of the translation, and for details, reference may be made to the description of the above-mentioned relevant method embodiment, and details are not repeated herein.

Further optionally, in one embodiment of the present disclosure, the training module 1002 is configured for acquiring a first translation result obtained by the at least two translation models translating the training sentence, based on the weighting model; acquiring a second translation result obtained by the at least two translation models translating the training sentence, based on the random weight distributor; acquiring respectively a quality score of the first translation result and a quality score of the second translation result; detecting whether the quality score of the second translation result is higher than the quality score of the first translation result; and if the quality score of the second translation result is higher than the quality score of the first translation result, allowing the weighting model to learn the weight results distributed by the random weight distributor to the at least two translation models based on the training sentence.

Further optionally, in one embodiment of the present disclosure, the training module 1002 is configured for configuring, using the weighting model, first weights for the at least two translation models translating the training sentence; and translating the training sentence using the multiple translation models, based on the first weights for the at least two translation models, to obtain the first translation result.

Further optionally, in one embodiment of the present disclosure, the training module 1002 is configured for configuring, using the random weight distributor, second weights for the at least two translation models translating the training sentence; and translating the training sentence using the multiple translation models, based on the second weights of the at least two translation models, to obtain the second translation result.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 11:
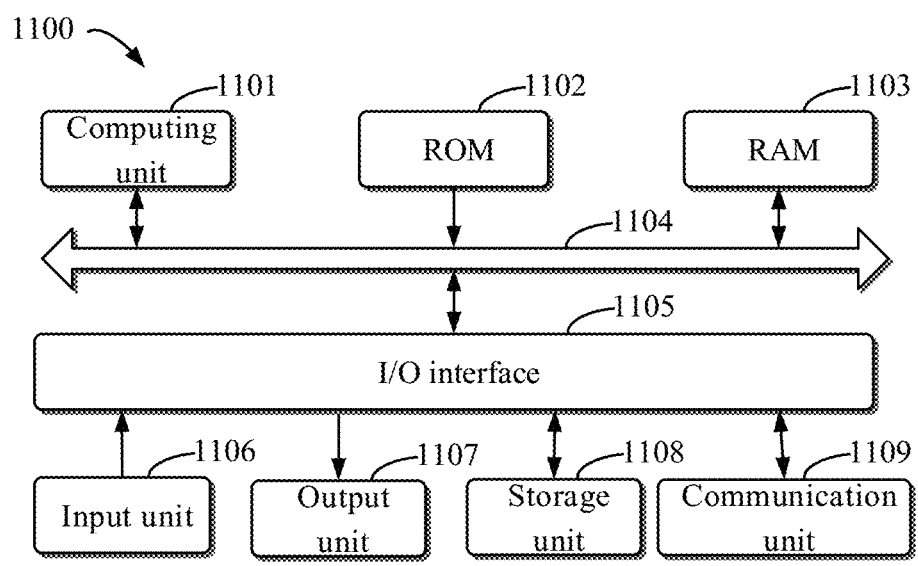
FIG. 11 is a block diagram of an electronic device configured for implement the above-mentioned method according to some embodiments of the present disclosure.

FIG. 11 shows a schematic block diagram of an exemplary electronic device 1100 which may be configured for implement the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile devices, such as personal digital assistants, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 11, the device 1100 includes a computing unit 1101 which may perform various appropriate actions and processing operations according to a computer program stored in a read only memory (ROM) 1102 or a computer program loaded from a storage unit 1108 into a random access memory (RAM) 1103. Various programs and data necessary for the operation of the device 1100 may be also stored in the RAM 1103. The computing unit 1101, the ROM 1102, and the RAM 1103 are connected with one other through a bus 1104. An input/output (I/O) interface 1105 is also connected to the bus 1104.

The multiple components in the device 1100 are connected to the I/O interface 1105, and include: an input unit 1106, such as a keyboard, a mouse, or the like; an output unit 1107, such as various types of displays, speakers, or the like; the storage unit 1108, such as a magnetic disk, an optical disk, or the like; and a communication unit 1109, such as a network card, a modem, a wireless communication transceiver, or the like. The communication unit 1109 allows the device 1100 to exchange information/data with other devices through a computer network, such as the Internet, and/or various telecommunication networks.

The computing unit 1101 may be a variety of general and/or special purpose processing components with processing and computing capabilities. Some examples of the computing unit 1101 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 1101 performs the methods and processing operations described above, such as the method according to the present disclosure. For example, in some embodiments, the method according to the present disclosure may be implemented as a computer software program tangibly contained in a machine readable medium, such as the storage unit 1108. In some embodiments, part or all of the computer program may be loaded and/or installed into the device 1100 via the ROM 1102 and/or the communication unit 1109. When the computer program is loaded into the RAM 1103 and executed by the computing unit 1101, one or more steps of the method according to the present disclosure may be performed. Alternatively, in other embodiments, the computing unit 1101 may be configured for perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input device, and at least one output device.

Program codes for implementing the method according to the present disclosure may be written in any combination of one or more programming languages. These program codes may be provided to a processor or a controller of a general purpose computer, a special purpose computer, or other programmable data processing devices, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A translation method, comprising:
   acquiring, based on a to-be-translated specified sentence and a pre-trained weighting model, a weight for each translation model in at least two pre-trained translation models translating the specified sentence; and
   translating the specified sentence using the at least two translation models based on the weight for each translation model translating the specified sentence, comprising:
   acquiring target words for locations generated in a process of translating the specified sentence by the at least two translation models, based on the weight for each translation model translating the specified sentence, comprising:
      acquiring several candidate words for each location predicted in the process of translating the specified sentence by each of the at least two translation models, and probabilities corresponding to the candidate words;
      calculating an inference probability of each candidate word for each location, based on the probability corresponding to each candidate word predicted during the translation by each of the at least two translation models, and the weight for each translation model translating the specified sentence; and
      determining the target word at each location based on the inference probability of the candidate words for each location.

2. The method according to claim 1, wherein translating the specified sentence using the at least two translation models based on the weight for each translation model translating the specified sentence further comprises:
   splicing the target words for the locations from front to back to generate a translation of the specified sentence.

3. The method according to claim 1, wherein calculating the inference probability of each candidate word for each location, based on the probability corresponding to each candidate word predicted during the translation by each of the at least two translation models, and the weight for each translation model translating the specified sentence comprises:
   for each candidate word for each location, taking the sum of the products of the probabilities corresponding to the candidate word predicted during the translation by the translation models and the weights for a corresponding translation model translating the specified sentence, as the inference probability of the candidate word for the location.

4. The method according to claim 1, wherein the weighting model is trained by:
   collecting training sentences; and
   training the weighting model based on the training sentences, the at least two pre-trained translation models and a preset random weight distributor.

5. The method according to claim 4, wherein training the weighting model based on the training sentences, the at least two pre-trained translation models and the preset random weight distributor comprises:
   acquiring a first translation result obtained by the at least two translation models translating a training sentence, based on the weighting model;
   acquiring a second translation result obtained by the at least two translation models translating the training sentence, based on the random weight distributor;
   acquiring respectively a quality score of the first translation result and a quality score of the second translation result;
   detecting whether the quality score of the second translation result is higher than the quality score of the first translation result; and
   if the quality score of the second translation result is higher than the quality score of the first translation result, allowing the weighting model to learn the weight results distributed by the random weight distributor to the at least two translation models based on the training sentence.

6. The method according to claim 5, wherein acquiring the first translation result obtained by the at least two translation models translating the training sentence based on the weighting model comprises:
   configuring, using the weighting model, first weights for the at least two translation models translating the training sentence; and
   translating the training sentence using the multiple translation models, based on the first weights for the at least two translation models, to obtain the first translation result.

7. The method according to claim 5, wherein acquiring the second translation result obtained by the at least two translation models translating the training sentence based on the random weight distributor comprises:
configuring, using the random weight distributor, second weights for the at least two translation models translating the training sentence; and
translating the training sentence using the multiple translation models, based on the second weights of the at least two translation models, to obtain the second translation result.

8. An electronic device, comprising:
at least one processor; and
a memory connected with the at least one processor communicatively;
wherein the memory stores instructions executable by the at least one processor to cause the at least one processor to perform a translation method comprising:
acquiring, based on a to-be-translated specified sentence and a pre-trained weighting model, a weight for each translation model in at least two pre-trained translation models translating the specified sentence; and
translating the specified sentence using the at least two translation models based on the weight for each translation model translating the specified sentence, comprising:
acquiring target words for locations generated in a process of translating the specified sentence by the at least two translation models, based on the weight for each translation model translating the specified sentence, comprising:
acquiring several candidate words for each location predicted in the process of translating the specified sentence by each of the at least two translation models, and probabilities corresponding to the candidate words;
calculating an inference probability of each candidate word for each location, based on the probability corresponding to each candidate word predicted during the translation by each of the at least two translation models, and the weight for each translation model translating the specified sentence; and
determining the target word at each location based on the inference probability of the candidate words for each location.

9. The electronic device according to claim 8, wherein translating the specified sentence using the at least two translation models based on the weight for each translation model translating the specified sentence further comprises:
splicing the target words for the locations from front to back to generate a translation of the specified sentence.

10. The electronic device according to claim 8, wherein calculating the inference probability of each candidate word for each location, based on the probability corresponding to each candidate word predicted during the translation by each of the at least two translation models, and the weight for each translation model translating the specified sentence comprises:
for each candidate word for each location, taking the sum of the products of the probabilities corresponding to the candidate word predicted during the translation by the translation models and the weights for a corresponding translation model translating the specified sentence, as the inference probability of the candidate word for the location.

11. An electronic device according to claim 8, wherein the weighting model is trained by:
collecting training sentences; and
training the weighting model based on the training sentences, the at least two pre-trained translation models and a preset random weight distributor.

12. The electronic device according to claim 11, wherein training the weighting model based on the training sentences, the at least two pre-trained translation models and the preset random weight distributor comprises:
acquiring a first translation result obtained by the at least two translation models translating a training sentence, based on the weighting model;
acquiring a second translation result obtained by the at least two translation models translating the training sentence, based on the random weight distributor;
acquiring respectively a quality score of the first translation result and a quality score of the second translation result;
detecting whether the quality score of the second translation result is higher than the quality score of the first translation result; and
if the quality score of the second translation result is higher than the quality score of the first translation result, allowing the weighting model to learn the weight results distributed by the random weight distributor to the at least two translation models based on the training sentence.

13. The electronic device according to claim 12, wherein acquiring the first translation result obtained by the at least two translation models translating the training sentence based on the weighting model comprises:
configuring, using the weighting model, first weights for the at least two translation models translating the training sentence; and
translating the training sentence using the multiple translation models, based on the first weights for the at least two translation models, to obtain the first translation result.

14. The electronic device according to claim 12, wherein acquiring the second translation result obtained by the at least two translation models translating the training sentence based on the random weight distributor comprises:
configuring, using the random weight distributor, second weights for the at least two translation models translating the training sentence; and
translating the training sentence using the multiple translation models, based on the second weights of the at least two translation models, to obtain the second translation result.

15. A non-transitory computer readable storage medium storing computer instructions for causing a computer to perform a translation method comprising:
acquiring, based on a to-be-translated specified sentence and a pre-trained weighting model, a weight for each translation model in at least two pre-trained translation models translating the specified sentence; and
translating the specified sentence using the at least two translation models based on the weight for each translation model translating the specified sentence comprising:
acquiring target words for locations generated in a process of translating the specified sentence by the at least two translation models, based on the weight for each translation model translating the specified sentence, comprising:
acquiring several candidate words for each location predicted in the process of translating the specified sentence by each of the at least two translation models, and probabilities corresponding to the candidate words;

calculating an inference probability of each candidate word for each location, based on the probability corresponding to each candidate word predicted during the translation by each of the at least two translation models, and the weight for each translation model translating the specified sentence; and determining the target word at each location based on the inference probability of the candidate words for each location.

16. The non-transitory computer readable storage medium according to claim 15, wherein translating the specified sentence using the at least two translation models based on the weight for each translation model translating the specified sentence further comprises:

splicing the target words for the locations from front to back to generate a translation of the specified sentence.

17. The non-transitory computer readable storage medium according to claim 15, wherein the weighting model is trained by:

collecting training sentences; and training a weighting model based on the training sentences, the at least two pre-trained translation models and a preset random weight distributor.

18. The non-transitory computer readable storage medium according to claim 17, wherein training the weighting model based on the training sentences, the at least two pre-trained translation models and the preset random weight distributor comprises:

acquiring a first translation result obtained by the at least two translation models translating a training sentence, based on the weighting model;

acquiring a second translation result obtained by the at least two translation models translating the training sentence, based on the random weight distributor;

acquiring respectively a quality score of the first translation result and a quality score of the second translation result;

detecting whether the quality score of the second translation result is higher than the quality score of the first translation result; and if the quality score of the second translation result is higher than the quality score of the first translation result, allowing the weighting model to learn the weight results distributed by the random weight distributor to the at least two translation models based on the training sentence.

* * * * *